Jan. 9, 1934.  B. STOCKFLETH  1,942,578
METHOD OF MAKING BEARING SLEEVES
Original Filed June 5, 1928   2 Sheets-Sheet 1
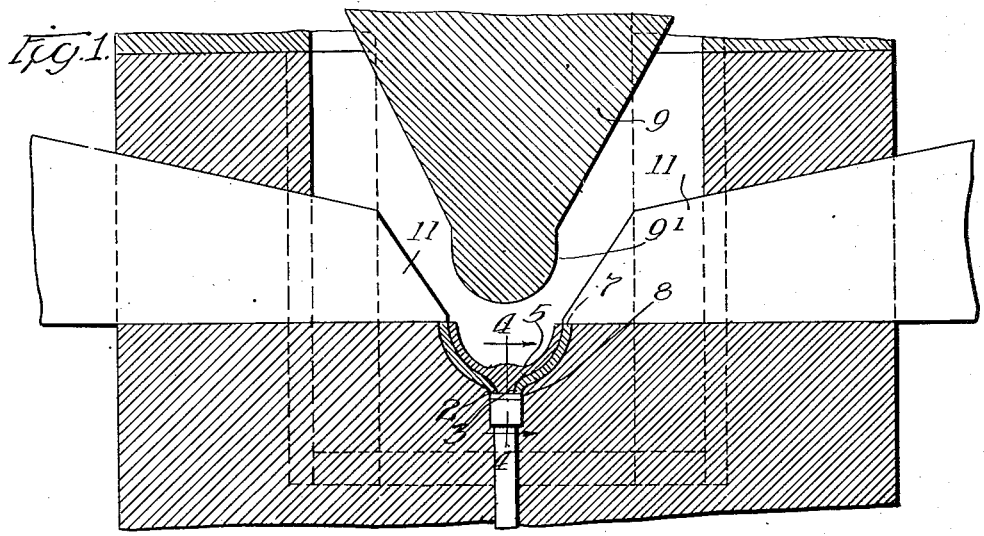
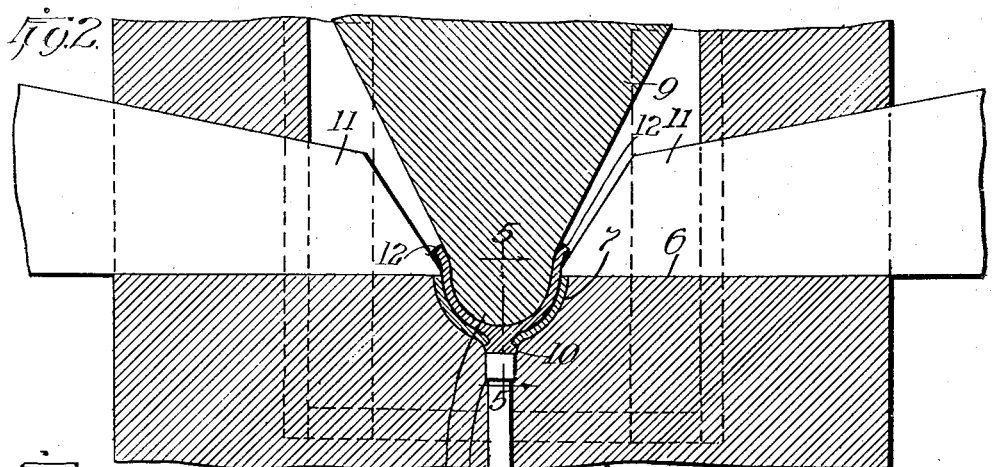
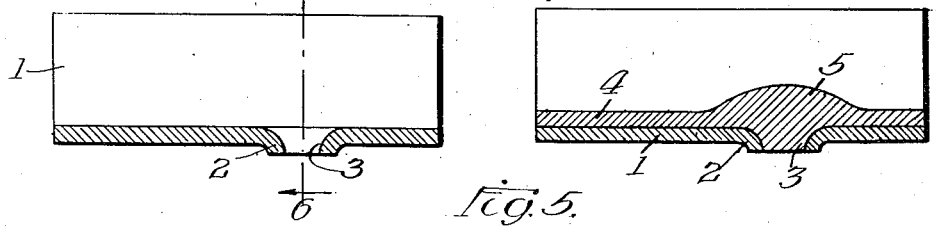
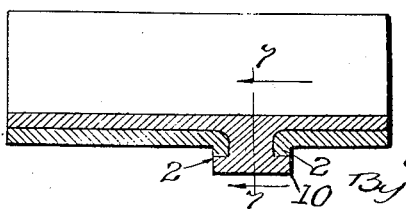
Witnesses
Harry P. L. White
Inventor
Berger Stockfleth
Edward Fay Wilson
By atty.

Jan. 9, 1934.    B. STOCKFLETH    1,942,578
METHOD OF MAKING BEARING SLEEVES
Original Filed June 5, 1928    2 Sheets-Sheet 2

Witnesses:
Harry R. L. White

Inventor:
Berger Stockfleth
By Edward Fay Wilson
Atty

Patented Jan. 9, 1934

1,942,578

UNITED STATES PATENT OFFICE 1,942,578

METHOD OF MAKING BEARING SLEEVES

Berger Stockfleth, Niles, Mich., assignor, by mesne assignments, to The Cleveland Graphite Bronze Company, Cleveland, Ohio, a corporation of Ohio Original application June 5, 1928, Serial No. 283,109. Divided and this application February 29, 1932. Serial No. 595,885

7 Claims. (Cl. 29—149.5)

This invention relates to improvements in bearing sleeves or shells and has special reference to the production of such sleeves sized within the allowable limits or tolerances and provided with projections on the backs of the sleeves by which the sleeves or liners are doweled to the housings in which they are used, the doweling projections being integral with the sleeves.

These sleeves or bearing liners are semi-cylindrical both inside and outside and have heretofore been produced by cutting tools which necessitated the separate application of the doweling projections which was not only expensive, but lacked that positive degree of accuracy as to position, size, etc., which is an essential in modern high speed interchangeable production.

By means of my invention I am enabled to produce accurately sized sleeves in large volume at low cost and either made wholly of Babbitt metal, or the like, or with a harder metal backing made of steel, brass or bronze and an inner lining or layer of babbitt or the like, and in each instance or type provided with an accurately placed and dimensioned doweling projection on the outer surface of the sleeve.

The process consists in producing a harder metal back shell preferably slightly shorter both circumferentially and longitudinally than the finished dimensions and slightly thicker radially. This harder metal backing preferably has the doweling projection on its back or outer surface at least partly formed, and may be either perforated or unperforated. The shell is then prepared to cause Babbitt metal to adhere preferably by applying a suitable bonding metal such as tin thereto and the Babbitt metal, which forms the inner wearing surface of the sleeve when finished, is preferably applied in accordance with the method disclosed in Patent No. 1,803,513 issued to me May 5, 1931. In the application of the Babbitt metal to the backing, I may provide an excrescence on the inner side of the sleeve opposite to the projection on the back.

The sleeve is then formed, sized and finished in a pair of dies which accurately size the sleeve, the dies being provided with one or more die openings through which the excess metal, if any, may be extruded. The die is provided with an opening or pocket into which the partly formed projection on the back of the sleeve is forced, the excrescence on the inner side of the sleeve, when such is used, assisting in this action.

In the case of the partly formed projection being perforated, the Babbitt metal is forced through the opening to assist in filling the projection-forming pocket in the die. In this case the excrescence on the inner surface when provided furnishes the metal for this purpose as well as for applying pressure for expanding and forming the projection to accurately fill the pocket.

Another advantage of the production of the projection in this manner is that without additional cost suitable or desired markings can be produced upon the outer flat surface of the projection in the forming process thus simplifying the designation of particular sleeves for special uses. Or the marking may be a suitable trademark or a notification that the bearing has been produced under certain patents.

This present application is a division of my original application filed June 5, 1928, Serial No. 283,109.

My invention will be more readily understood by reference to the accompanying drawings forming part of the specification and in which:—

Fig. 1 is a fragmentary, vertical, sectional view of a plunger and co-operating die for forming the bearing sleeves, shown before the plunger enters the die;

Fig. 2 is a view similar to Fig. 1 but showing the plunger and die as they appear at the close of the forming operation;

Fig. 3 is a central, longitudinal section of one of the backings for a bearing sleeve;

Fig. 4 is a central, longitudinal section of a bearing sleeve taken on the line 4—4 of Fig. 1, and showing the backing with the Babbitt metal lining prepared for the final forming operation;

Fig. 5 is a central, longitudinal section of the finished bearing and taken on the line 5—5 of Fig. 2;

Figure 6:
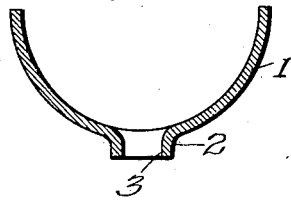
Fig. 6 is a cross-section of the backing sleeve on the line 6—6 of Fig. 3.

In said drawings I have shown a semi-cylindrical backing 1 such as I provide in the production of my improved bearing sleeve. This backing is preferably formed in a press out of sheet metal such as steel, bronze or brass and in the forming process is provided with a formed out projection 2 on its back which is preferably, though not necessarily, perforated being open at its bottom, as shown at 3, Fig. 3.

In the process of producing a bearing lining or sleeve the next step is to tin the blank back 1 and then cast a Babbitt metal lining within the backing, as shown at 4, Fig. 4. This lining is preferably though not necessarily provided with a rounded excrescence 5 opposite to the projection 2 to provide metal to complete the interlocking projection. Having produced the Babbitt metal lining 4 preferably in accordance with the method disclosed in my said co-pending application, I next proceed to complete the bearing sleeve by applying a heavy pressure thereto in dies made for the purpose. Suitable dies and their operation are fully disclosed in United States Patent No. 1,722,995, issued to Frederick W. Burger and Berger Stockfleth on August 6, 1929.

In Figs. 1 and 2 herein, I have illustrated such dies which roughly consist of a lower die member 6 having a semi-cylindrical die opening 7 in which the outer semi-cylindrical surface of the sleeve is sized. This die member is provided with a depression 8 in its bottom adapted to size the projection which it is desired to produce upon the back of the sleeve. There is a co-operating plunger or die member 9 having a semi-cylindrical lower end 9' which co-operates with the opening 7 to form the inner surface of the sleeve.

The upper member 9 is moved up and down by means of a suitable press mechanism, not shown. When the upper die member enters the lower member and is forced down to its limit, it is forced down with sufficient pressure to cause the Babbitt metal lining 4, which is thicker radially than the finished product, to be thinned out and at the final position of the dies the radial thickness is that which is desired in the finished sleeve. Closures 11 for the upper edges of the die space may be provided to prevent the circumferential elongation of the backing beyond the dimensions of the finished sleeve. These closures 11 when used also operate to define the extrusion slots at the sides of the die member 9 through which any excess metal may be forced, as shown at 12, Fig. 2.

In this pressing step the first action of the plunger 9 is to contact with the excrescence 5 and apply pressure thereto to force the Babbitt metal through the opening 3 and to fill the depression 8 in the bottom of the lower die.

Figure 7:
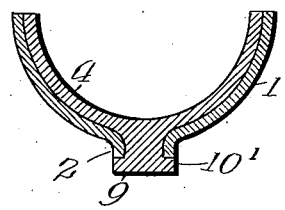
Fig. 7 is a cross-section of the finished sleeve taken on the line 7—7 of Fig. 5.

The tremendous pressure to which the metal is subjected causes it to completely fill the depression 8 and even causes the thimble 2 to expand and be sized on its outer surface by the wall of the depression 8. The applied pressure forces the Babbitt metal out through the opening and forms a Babbitt metal button 10 at the outer end of the projection 2, thus completing and finishing the doweling projection as shown at 10, Figs. 5 and 7. It is obvious that any marking desired can be impressed in the outer flat surface of the finished doweling projection, as shown in Fig. 2, by merely building up the design wanted on the bottom of the depression 8.

Figure 8:
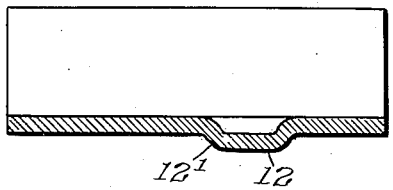
Fig. 8 is a view similar to Fig. 3, but showing a backing wherein the projection is not perforated.
Figure 9:
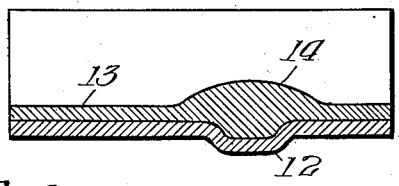
Fig. 9 is a view similar to Fig. 4 but showing a non-perforated projection on the backing.
Figure 10:
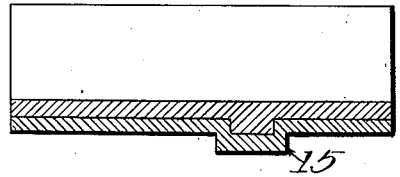
Fig. 10 is a view of a finished sleeve made with a non-perforated projection on the backing.

In some instances it is best not to cut out the bottom of the partly formed projection and Figs. 8, 9 and 10 illustrate this method.

Fig. 8 is a longitudinal section of a prepared backing having a doweling projection 11 partly formed but the bottom 12 of which has not been cut out as in the form first described.

The following procedure is quite similar to that already described in that after the backing is partly formed, as shown in Fig. 8, it is then tinned and the Babbitt metal lining 13 is cast in place, thicker radially than the finishing lining and preferably with an excrescence 14 on the inside opposite to the partly formed doweling projection 11. Then the sleeve is formed by pressure as already described, the first action being to press down on the excrescence 14 causing the Babbitt metal to force the partly formed doweling projection 11 down into the depression 8 in the lower die member and thus accurately finish and size the doweling projection at the same time that the shell is completed in the press. This completed doweling projection is shown at 15, Fig. 10.

Under some conditions it is not desired to make use of a harder metal backing but to make the whole sleeve of Babbitt or similar bearing metal. For this purpose it is preferred to cast a sleeve blank preparatory to the forming step but such is not an absolute necessity, it being necessary merely that sufficient Babbitt metal be present in the lower die so that when the upper member is forced in to its limit all of the die space will be completely filled with the Babbitt metal.

Figure 11:
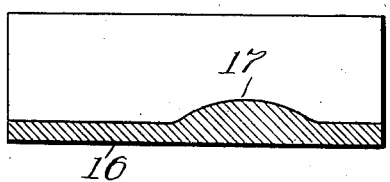
Fig. 11 is a view similar to Figs. 4 and 9 but showing a sleeve made entirely of Babbitt metal, that is, without a harder metal back.
Figure 12:
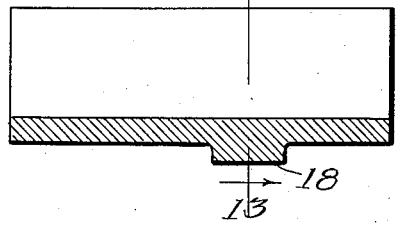
Fig. 12 is a view similar to Figs. 5 and 10 and showing the all Babbitt sleeve in finished condition.
Figure 13:
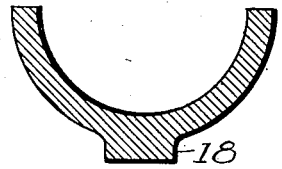
Fig. 13 is a transverse section on the line 13—13 of Fig. 12.

When a pre-cast sleeve blank is used, as shown in Fig. 11, at 16, it, like the previously described sleeves, may be provided with an excrescence 17 on its inner side and opposite to the place where the doweling projection is desired. During the pressing step the Babbitt metal is forced out into the dowel depression 8 in the lower die producing the finished dowel projection, as shown at 18, Figs. 12 and 13.

It is thus seen that by means of this invention, a solid or integral doweling projection is cheaply and accurately produced upon the outer surface of a finished bearing sleeve.

As many modifications of my invention will readily suggest themselves to one skilled in the art, I do not limit or confine my invention to the specific sequence of steps herein described and claimed except within the scope of the appended claims.

The improved method herein illustrated and described is not claimed herein, such forming the subject matter of my co-pending application filed June 5, 1928, Serial No. 283,109.

I claim:

1. The method of producing a doweling projection on the back of a finished and sized bearing sleeve made partly of Babbitt or similar bearing metal, which consists in providing a harder metal backing shell having a partly formed doweling projection formed thereon, the projection being perforated at its bottom, applying a suitable bonding metal such as tin to the backing, applying Babbitt or similar metal to the backing to form a lining within the backing, the whole being thicker than the finished bearing sleeve, subjecting the composite sleeve thus formed to a very heavy pressure in dies provided with a depression, of the form, shape and size of the doweling projection desired and adapted to receive the partly formed projection on the backing, and by the said heavy pressure reducing the radial thickness of the sleeve, forcing the partly formed projection to conform to said depression, forcing the softer metal of the lining through the opening in the bottom of the partly formed projection to completely fill said depression, and forcing the metal of the sleeve to fill the die space of the dies and whereby the sleeve is accurately sized.

2. The method of producing doweling projections on the backs of finished and sized bearing sleeves made at least partly of Babbitt or similar bearing metal, which consists in forming a blank approximately of the size desired, said blank being of a greater thickness radially than the finished sleeve, said blank having a protuberance or excrecence of the Babbitt metal upon its inner surface opposite to the position of the desired doweling projection, and subjecting the rough blank to a forming pressure in dies provided with a depression, of the form, shape and relative position of the desired doweling projection and by such pressure reducing the radial thickness of the rough blank and forcing the metal of the sleeve to fill said depression and also to fill the die space of the dies and whereby the sleeve is accurately sized.

3. The method of producing a doweling projection on the back of a finished and sized bearing sleeve made partly of Babbitt or similar bearing metal, which consists in providing a harder metal backing shell having a partly formed doweling projection formed thereon, applying bearing metal to the inner side of the shell to form a lining, the lining formed with a protuberance or excrecence on its inner surface opposite to the partly formed doweling projection, subjecting the composite sleeve thus formed to a heavy pressure in dies provided with a depression, of the form, shape and size of the doweling projection desired and adapted to receive the partly formed projection on the backing and by the said heavy pressure reducing the radial thickness of the sleeve, forcing the metal of the sleeve to fill said depression and the die space of the dies and whereby the sleeve is accurately sized.

4. The method of producing a doweling projection on the back of a finished and sized bearing sleeve made partly of Babbitt or similar bearing metal, which consists in providing a harder metal backing shell having a partly formed doweling projection formed thereon, the projection perforated at its outer end, applying bearing metal such as Babbitt or similar metal to the lining within same, the lining formed with a protuberance or excrecence on its inner surface opposite to the partly formed doweling projection on the shell, subjecting the composite sleeve thus formed to a heavy pressure in dies provided with a depression, of the form, shape and size of the doweling projection desired and adapted to receive the partly formed projection on the backing, and by the said heavy pressure reducing the radial thickness of the sleeve, forcing the partly formed projection to conform to said depression, forcing the softer metal of the lining through the opening in the outer end of the partly formed projection to completely fill said depression, and forcing the metal of the sleeve to conform to the die space of the dies and whereby the liner is accurately sized.

5. The method of producing a finished bearing sleeve of the kind described, and having an outer finished cylindrical surface arranged and adapted to be seated in a cylindrical housing, the method including the provision of an integral doweling projection on the back of the sleeve, and which method consists in forming a sleeve blank approximately of the size and shape desired, said blank having at least one dimension greater than the similar dimension of the finished sleeve, subjecting the blank to a heavy forming pressure in forming dies provided with a depression of the form, shape and relative position of the desired doweling projection, the applied pressure being sufficient to cause the metal of the blank to flow and to fill said depression and the die space of the dies and whereby the sleeve is accurately sized.

6. The method of producing a finished bearing sleeve of the kind described, and having an outer finished cylindrical surface arranged and adapted to be seated in a cylindrical housing, the sleeve having at least an inner lining of Babbitt or similar metal, the method including the provision of an integral doweling projection on the outer finished cylindrical surface, and which method consists in forming a sleeve blank with a Babbitt or similar metal lining, the blank being of greater radial thickness than the finished sleeve, and subjecting the blank to a heavy forming pressure in forming dies provided with a depression of the form, shape and relative position of the desired doweling projection, the applied pressure being sufficient to thin the blank to the desired radial thickness and cause the metal to flow into and fill said depression as and for the purpose specified.

7. The method of producing a finished and accurately-sized bi-metal bearing sleeve of the kind described, and having an outer finished cylindrical surface arranged and adapted to be seated in a cylindrical housing and an integral doweling projection on said outer surface, and which method consists in the provision of a sleeve blank having an outer backing of harder metal such as steel and an inner lining of Babbitt or similar metal, the blank being thicker radially than the finished sleeve and provided with an integral partly-formed projection on the back of the sleeve, subjecting the blank to a heavy forming pressure in dies provided with a depression of the form, shape and size of the desired doweling projection and arranged to receive said partly-formed integral projection, the applied pressure being sufficient to thin the blank to the desired finished thickness and to cause the metal of the blank to flow into and fill said depression as and for the purpose specified.

BERGER STOCKFLETH.